June 6, 1933.  W. P. VALENTINE  1,912,604
INTERNAL COMBUSTION ENGINE
Filed Jan. 30, 1930   7 Sheets-Sheet 1

Inventor
Warren P. Valentine
by Attorney

Witness:

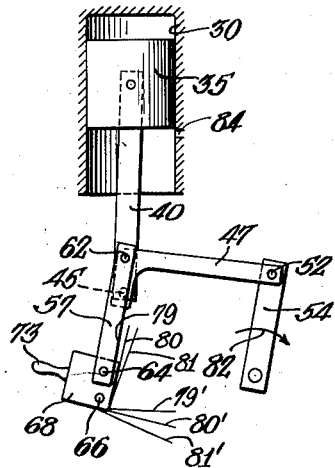
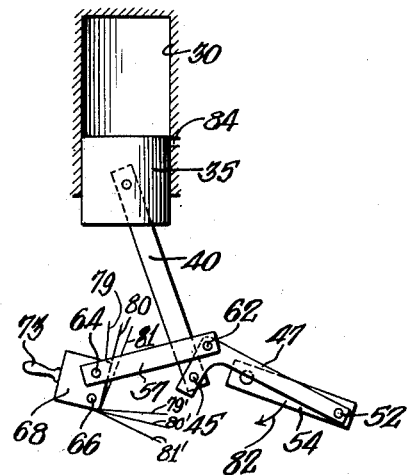
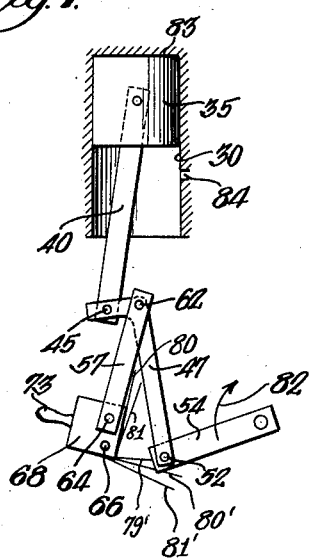
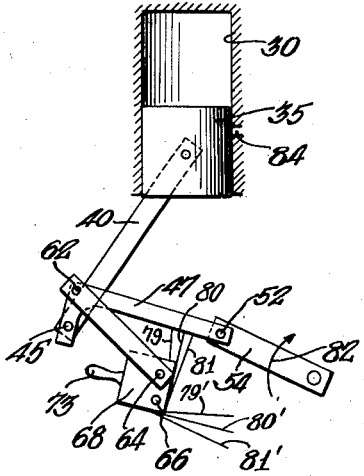

June 6, 1933. W. P. VALENTINE 1,912,604
INTERNAL COMBUSTION ENGINE
Filed Jan. 30, 1930 7 Sheets-Sheet 3

Inventor
Warren P. Valentine
by [Attorney signature]
Attorney

Witness:
[signature]

June 6, 1933.   W. P. VALENTINE   1,912,604
INTERNAL COMBUSTION ENGINE
Filed Jan. 30, 1930   7 Sheets-Sheet 5

Witness:
Walter Cheng

Inventor
Warren P. Valentine
by
Attorney

June 6, 1933.  W. P. VALENTINE  1,912,604
INTERNAL COMBUSTION ENGINE
Filed Jan. 30, 1930  7 Sheets-Sheet 6
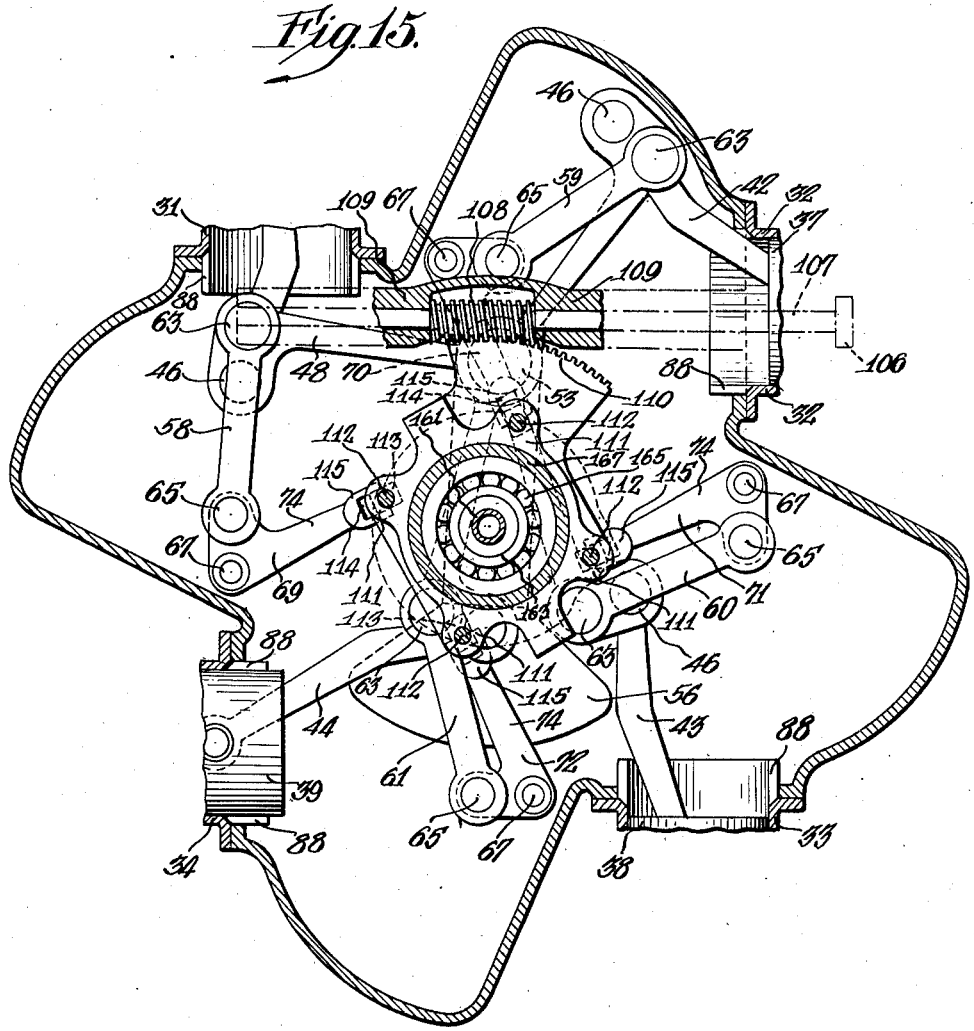

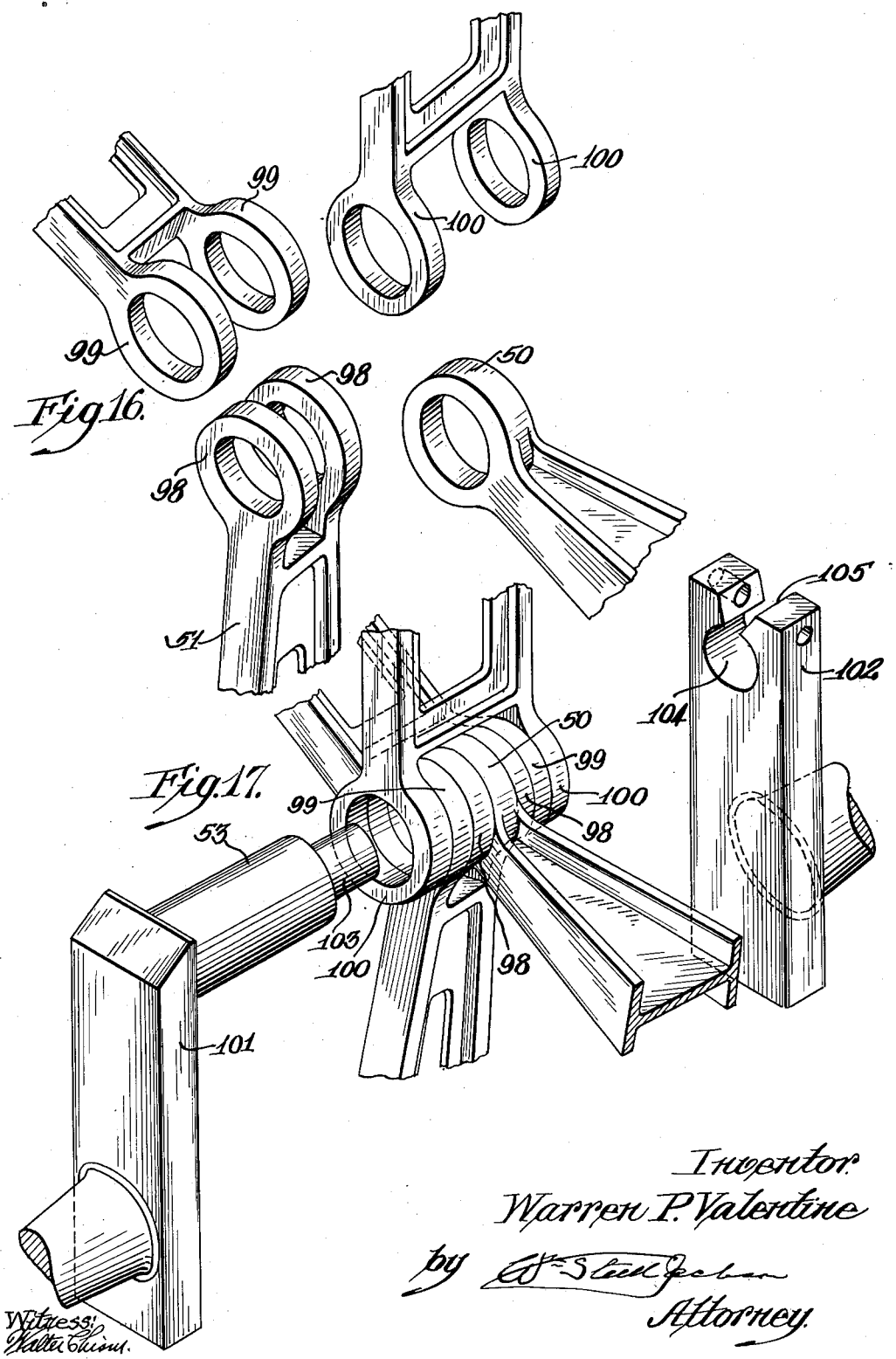

Patented June 6, 1933

1,912,604

UNITED STATES PATENT OFFICE

WARREN P. VALENTINE, OF LINE LEXINGTON, PENNSYLVANIA

INTERNAL COMBUSTION ENGINE

Application filed January 30, 1930. Serial No. 424,691.

My invention relates to explosion engines of a type in which the piston rod does not directly engage the crank pin of the engine.

One purpose of my invention is to provide for quick, easy and effective variation of the intake, compression and explosion strokes and, particularly, of the relation between them.

A further purpose is to provide an angular connecting rod in train between the piston rod and the crank and subject to variant control, and to adjust the relation between these parts to change the lengths of the strokes.

A further purpose is to connect the crank to the piston rod of such an engine through an L-shaped connecting rod and outside swinging link and to vary the point about which the link swings for the purpose of changing the relation between the intake and the explosion strokes, and permissibly changing the relation between the suction and compression strokes.

A further purpose is to use the slip stream from an airplane propeller to cool the inner end of the piston of an internal combustion engine.

A further purpose is to use inlet ports of a size greatly in excess of that of the exhaust ports.

A further purpose is in an engine of the character described to provide an exhaust port normally passed by the piston near the end of its explosion stroke at one adjustment of a controllable stroke, but not at another adjustment thereof, to reduce the pressure so that the scavenging can be done more quickly and effectively on the clearing stroke.

A further purpose is to provide greater relative compression for the gas intake where adjustment of the stroke provides for a longer suction stroke.

A further purpose is to counterweight the moving parts in an engine of the character illustrated by counterweighting at the link and crank arm respectively.

A further purpose is to accommodate the various strokes of an explosion engine to the special needs of different arts, such as, for example, marine or automotive service.

A further purpose is to use together a plurality of explosion engine cylinders, pistons, angular connecting rods and links controlling the operation of the rods upon the same crank or upon a plurality of cranks placing the cylinders at angles to each other symmetrically about a common crank shaft so that an exaggerated variation of connecting rod speed for each engine unit may be compensated by the acceleration or deceleration taking place in other engine units of the same system.

In a plurality of explosion engines having link control of the comparative intake and explosion strokes, a further purpose is to adjust the strokes of all of the engines together by shifting the positions of all of the link anchorages coincidentally.

A further purpose is to apply in symmetrical quadrant positions about the circumference of a crank shaft, cylinders and connections each extending the explosion stroke about more than a quadrant of crank movement, using the overlap of the strokes to improve the torque and tend to make it uniform.

A further purpose is to vary the intake stroke and ratio of compression to intake in an airplane engine to vary the combustible charge or to secure the same charge at a lower air pressure.

Further purposes will appear in the specification and in the claims.

My invention relates to the methods involved as well as to mechanism by which these methods can be carried out.

I have preferred to illustrate my invention both diagrammatically and by the design of an actual engine so as to secure the benefit of the simplicity of the diagrammatic illustration without sacrificing the benefit secured by complying with the statute in illustration of the more finished form of my invention.

Figures 5–8 and 9–12 are corresponding diagrammatic views, respectively for each of two other initial adjustments of the parts.

Figures 1–12 are intended to illustrate in a general way the variations of stroke secured. Each sheet of four figures represents positions of the parts of the same cylinder at the ends of the several strokes for one adjustment.

Figure 15 is a fragmentary enlarged section of Figure 14 taken on the line 15—15.

Figure 16 is a fragmentary perspective view showing the ends of the several connecting rods ready for assemblage about a common crank pin.

Figure 17 is a view similar to Figure 16 but with the connecting rods partly assembled with the crank.

Figure 18 is a diagrammatic view showing the four cylinders of an engine in line.

Figure 1:
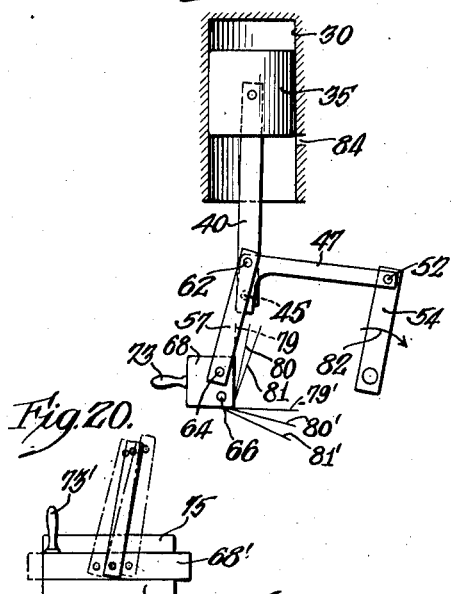
Figures 1–4 are diagrammatic views showing the relation of parts at four different points of the cycle of one of the engines illustrated corresponding to one initial adjustment of the parts.

In the United States patent to Atkinson, No. 367,496, August 2, 1887, is shown an expansion engine in which the piston rod does not operate directly upon the crank pin of the engine but turns the crank through a connecting rod which is pivoted to the crank pin at one end and to the piston rod at the other, and which is controlled by a link which is pivoted to the connecting rod at the second end but at a distance from the point of pivot connection with the piston rod.

My invention is applied to an explosion engine of the same general type as in this Atkinson patent in so far as has been explained above but which as illustrated is a much more desirable explosion engine than that of Atkinson. In the broad aspects of my invention it is my intention to apply to any engine of the general type of Atkinson and of my disclosure and in the more restricted subject matter it is my intention to protect the desirable differences between my engine of this type and that shown by Atkinson.

In the various uses to which internal combustion engines are put there is wide variation in the need for power under different conditions of service. For example, in the ordinary automotive uses and in marine applications, the energy required at starting is greatly in excess of that required during normal running service. This is true in airplanes with further variation in this case due to the fact that the intake of fuel will vary, other things being equal, according to the height at which the plane is flying and the consequent variation in air pressure effective upon the carburetor.

I have discovered that by suitable selection of the lengths of different connecting members and their points of pivotal support and by variation of the relations between the parts, particularly of the location of the support for the controlling link, the lengths and comparative lengths of the explosion, suction and compression strokes of an engine of the general type shown by Atkinson can be adjusted easily to secure wide variation in the performance of the engine, suiting both to supply additional starting torque and to the variation of fuel feed and the percentage of compression and actual compression at different actual intakes or at the normal intakes at different atmospheric pressures.

I have further discovered that the extension of the explosion stroke over more than a quadrant of crank movement in a structure of the general character shown in the Atkinson patent fits this type of engine particularly well for the equalization of torque throughout crank revolution in multicylinder engines.

In the Atkinson patent and in my several figures the piston passes through the entire cycle of the compressive, scouring and suction strokes for each rotation of the crank. The connections by which this is accomplished are best seen in diagrammatic figures 1–12 and in Figure 16 in all of which ignition is of course contemplated though in some it is not shown because the character of the invention is not dependent upon the type of ignition. In all of these views suitable valve mechanism is contemplated though it has not been shown in the diagrammatic figures.

*The diagrammatic form*

Though I later describe a practical multicylinder engine embodying the members, I believe that the discussion will be helped by reference to the diagrammatic figures 1–12 in which the same parts are shown in three different initial positions or settings in Figures 1–4, 5–8 and 9–12 respectively whose relations will be later explained.

The three settings correspond to different pivotal positions for the outer end of the link controlling the movement of that end of the connecting rod farthest from the crank.

In each setting four positions of the parts are seen corresponding to the change of direction of the four strokes, as distinguished from the positions of the parts in the other figures (Figure 16 particularly) where the parts are at quadrant settings for the same crank and crank position.

Figure 9:
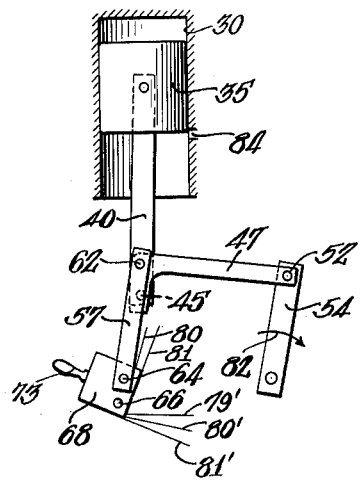

In Figures 1, 5 and 9 when the piston has completed its compressive stroke an ignition takes place.

Figure 2:
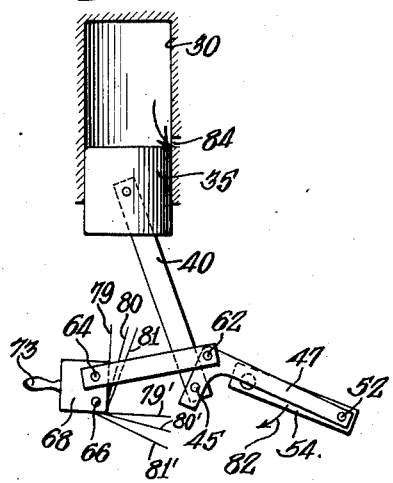
Figure 10:
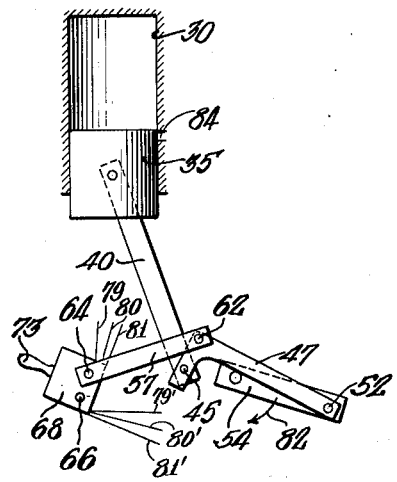

In Figures 2, 6 and 10 the explosive stroke has been completed and the piston is about to begin its scavenging stroke.

Figure 3:
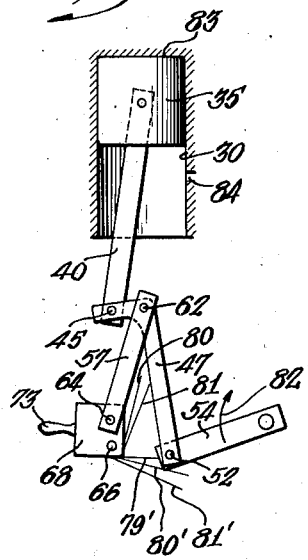
Figure 11:
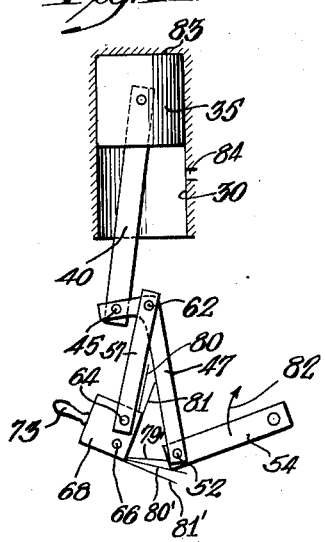

In Figures 3, 7 and 11 the scavenging stroke has been completed and suction begins.

Figures 4, 21:
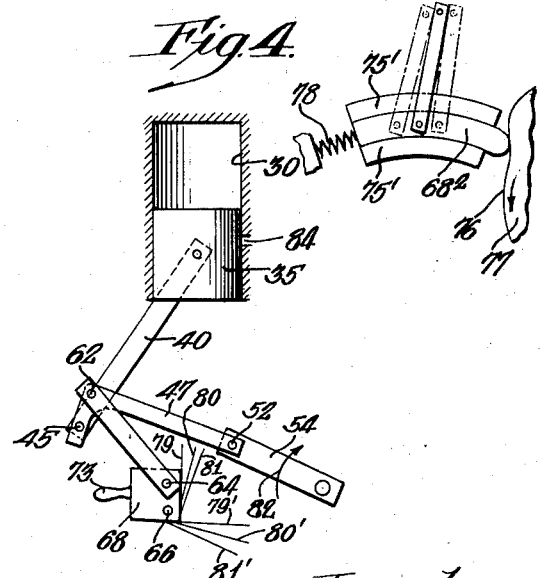
Figure 12:
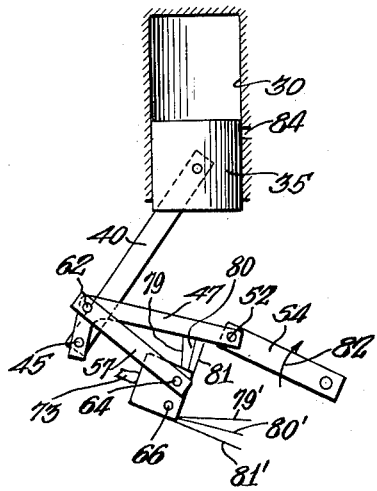

In Figures 4, 8 and 12 the suction stroke changes to compressive stroke.

Figure 13:
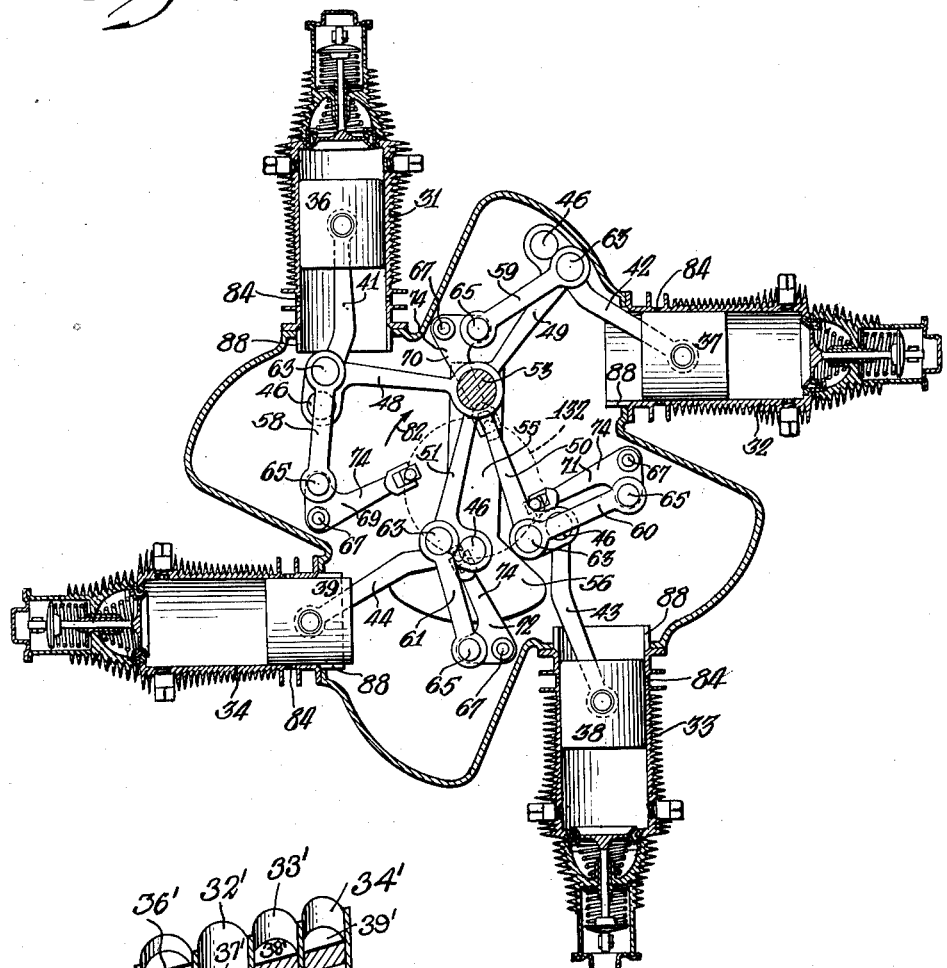
Figure 13 is a section of Figure 14 taken upon line 13—13.

For convenience in application to the multicylinder form of the other figures reference characters are inserted within this diagrammatic discussion referring to the four corresponding parts in the four cylinders of the actual construction best seen in Figure 13, it being assumed that the parts of the diagrammatic figure correspond generically with the parts associated with the several cylinders.

The cylinders 30 (Figures 1–12) 31, 32, 33 and 34 (Figure 13) are for present purposes conventional cylinders within which any suitable pistons 35, 36, 37, 38 and 39 operate. The piston rods 40, 41, 42, 43 and 44 do not connect with the crank pins directly but instead are pivoted at pins 45, 46 to connecting rods 47, 48, 49, 50 and 51.

Where a plurality of cylinders is shown these connecting rods may engage the same crank pin 52, 53 of crank 54, 55 where the cylinders are radially in the same plane, as is common in airplane use and as is shown in Figure 13, or the cylinders may be in line and the connecting rods 48', 49', 50' and 51' may engage separate crank pins (53', 53$^2$, 53$^3$ and 53$^4$) with separate cranks as in Figure 18. The crank is counterbalanced, as is shown in Figure 13, for example, at 56.

The paths of the connecting rods are controlled by links 57, 58, 59, 60 and 61 which are pivoted to the connecting rods at pins 62, 63 and swing about the adjustable pivots 64, 65.

I find it highly advantageous to so place the link pin pivots to the connecting rods with respect to the piston rod pivots to the connecting rods that the links overlap the piston rods when the parts are in the positions shown in Figure 13 at cylinder 31, in this particular preferring to differ sharply from the spacing of these ends so as not to provide overlap in this compression position in the Atkinson form.

In use the pivots 64, 65 are set initially and this setting controls subsequent operations until they are reset. These link pivots can be moved easily and quickly to vary the suction, compression and explosion strokes of the pistons and the relations of these strokes to each other. Obviously the way in which this adjustment is effected is a matter of convenience rather than a matter of principle. Because this is most convenient I have indicated the pivot points 66, 67 as located in supports in the form of blocks 68, 69, 70, 71 and 72 which in Figures 1–12 and 13 swing about centers 66 and 67, being moved by any suitable handle 73 or rocker arm 74.

Figure 20:
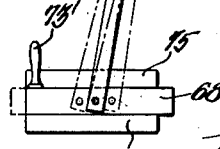
Figures 20 and 21 are diagrammatic views showing additional means for varying the link pivot by hand or automatically.

In the diagrammatic Figures 20 and 21 the pivot supports 68', 68$^2$ slide within guides 75, 75' and are controlled by handle 73', or by any one of several cam faces 76 upon cam 77 which may be carried by the crank shaft. The spring 78 holds the support 68$^2$ against the cam. They can be held suitably in the several positions when set. The law of the adjusting movement is relatively unimportant providing that the pivot points may be moved to and held in positions suitable to accomplish the controlling functions desired.

I have discovered that the lengths and pivot points of the several parts may be so selected and the link support may be so placed that for different adjustment positions of the link pivot the piston shall have the same or substantially the same position at the end of scavenging strokes and that the length of the scavenging strokes and of the other strokes may be adjustable to increase the suction stroke, for example, as compared with the explosive stroke (in fact very desirably lengthening one while shortening the other and vice versa) and the compression stroke may be made such that with the larger suction stroke there is a greater relative compression.

Though these adjustments are very desirable in airplane, marine and automotive propulsion, I recognize that the adjustment of the pivotal support for the link is not useful for securing these particular relations between the strokes alone but affords a new tool, as it were, by which any other desirable relations between the parts may be effected, providing a new relation of the piston, connecting rod and link with each new setting of the center about which the link swings. I wish therefore to be understood as claiming this variation of the link center broadly in addition to claiming it in connection with the advantageous special interrelation of the strokes particularly pointed out.

The relations of the lengths of the connecting parts, and the lateral position of the range of link pivot adjustment with respect to the axis of the cylinder have been selected in the diagrammatic form and also in the construction best seen in Figure 13 so as to secure substantially uniform end point for the scavenging strokes and so that, with shifting of the pivot in a clockwise direction in the diagrammatic views from the position in Figures 1–4 through that in Figures 5–8 to that in Figures 9–12 the explosion stroke will be progressively reduced and the suction stroke will be progressively increased. At the same time the compression stroke will be progressively increased so that the actual compression per unit volume of intake, (i. e., the percentage of compression) will also be increased, suiting well to use in more highly rarefied atmospheres where a less concentrated charge needs greater unit compression and where higher temperatures of the explosion are desired.

The positions of the block in the several groups of the diagrammatic figures are shown in these figures by lines 79, 79' for Figures 1–4; 80, 80' for Figures 5–8; and 81, 81' for Figures 9–12.

Though the range of block adjustment has been taken in the examples primarily to secure substantially the same piston position at the end of the scouring stroke, whatever the link pivot setting, with the proportions shown this range lies between an extreme counterclockwise position of the block, where further movement counterclockwise does not additionally reduce the suction stroke, and an extreme clockwise position of the block in which further movement of the block in that direction is not effective to further reduce the length of the explosion stroke.

In all of the diagrammatic figures and in Figure 13, the crank moves in clockwise direction as shown by arrows 82. In the positions of Figures 1, 5 and 9 (where the piston is at the turn from compression stroke to explosion stroke) the explosion drives the piston and piston rod, and hence the left end of the connecting rod outwardly with respect to the cylinder. Because the connecting rod is pivoted to the link this movement is guided to swing the connecting rod bodily with the outer end of the link in a clockwise direction, forcing the connecting rod in the direction of its length (nearly tangentially to the crank position shown) so as to turn the crank in a clockwise direction in the several figures to the positions shown in Figures 2, 6 and 10 respectively, at the limits of the explosion strokes. It should be noted that this stroke turns the crank more than a quadrant.

Continued revolution of the crank carries the piston back to the end of its scavenging stroke (also more than a quadrant of crank movement) shown in Figures 3, 7 and 11, respectively, with its end 83 at the end of the cylinder and subsequently, with the opening of the inlet valve, to the end of the suction stroke shown in Figures 4, 8 and 12, and back to the end of the compression stroke at which this cycle started in Figures 1, 5 and 9.

It will be evident that no fixed relation exists between the inwardmost positions of the piston upon the compression and scavenging strokes, respectively, so that the scavenging stroke may very completely drive the products of combustion from the cylinder without interfering with provision for a very different space (and here a space capable of being varied) for the compressed gases at the end of the compression stroke. Likewise the end of the suction stroke and the end of the explosion stroke bear no fixed relation to each other and may both be varied during operation, so that each may be determined separately to the best advantage.

The above differential between the strokes is highly desirable from the standpoint of design, making it possible to select each of these strokes to the best advantage for its own particular purpose. Moreover the ability to adjust the strokes and to adjust the extent of the differential makes it possible to subcharge or supercharge at will to suit special conditions of intended operation, making the adjustment without stopping the engine by merely shifting the pivot point for the link by which the path of the connecting rod is controlled.

The ability to subcharge or supercharge at will, and to vary the extent of compression and the extent of the explosion stroke tremendously increase the range of working conditions to which my engine is suited.

I find that I can secure either a higher or a lower rate (percentage) of compression with variation of the suction stroke and can therefore, of course, also effect the change in extent of suction stroke without appreciable variation in the percentage (ratio) of compression secured.

Whatever the intended use, the several adjustments shown and their intermediate adjustments (if it be desired to more finely divide the transition from one block position to another) afford opportunity to meet the need of greater power without so much regard to economy at the one end of the adjustment and to secure more economical conditions of service at the other end.

In marine and automotive uses the need of high starting torque is met by adjustment of the link pivot to a position corresponding generally to that in Figures 9, 10, 11 and 12 where there is maximum fuel intake and a larger proportionate compression than in the other adjustments. Since the need for operating the engine under these conditions is of but short duration the engine can stand the additional temperatures resulting.

In airplane work the temporary supply of high starting torque is beneficial as in other applications of the invention, with an additional advantage in this adjustment for sustained operation at high altitudes, since the additional fuel intake is there needed on account of the more rarified condition of the air, and higher compressions are needed on account of the more rarified content sucked in and because of the desirability of additional heating of the engine.

In the position shown in Figures 1, 2, 3 and 4 conditions are favorable for running at highest economy with a maximum explosion stroke and with a minimum of fuel intake. This applies to all uses of the invention. It will be noted that in this adjustment (see Figure 2), the piston on its explosion stroke uncovers exhaust ports 84 distributed about the circumference as needed, which ports are not opened in the corresponding piston positions in Figures 6 and 10. These ports provide discharge of a considerable part of the products of combustion before the clearing stroke begins, which again is advantageous for running at highest economy.

As the ports 84 are open in the position of Figure 2 (that of normal operation) on opposite sides of the cylinder, a stream of air can be passed into the ports on the one side of the cylinder and, mingled with products of combustion, out of the opposite ports 84, cooling the inner end of the piston to cool the piston. This can be used to advantage in airplane operation, using the slip stream of the impeller to drive the air through the cylinder across the inner face of the piston. In Figure 13, for example, the shaft of the crank 55 may be a propeller shaft, bringing the cylinders shown into the slip stream path from the propeller (not shown).

As elsewhere discussed at more length in connection with the structural figures the explosion and clearing strokes are both greater than 90° and the suction and compression strokes are both less than 90°. Advantage may be taken and in the structural form is taken of a feature common in automotive engineering of opening the exhaust before the completion of the explosion stroke.

At different intermediate positions between the two extremes, i. e., between Figures 1-4 and 9-12, varying advantage may be taken of the benefits from adjustments to the extreme positions, a mid-position betwen the extremes offering medium power and economy for automotive, marine and airplane services. In airplane work this adapts to sustained service at intermediate air pressures between normal air pressure and the rarefied condition of the higher altitudes. By showing but three positions it is not my intention to suggest that the adjustments need be limited to these three but merely to indicate the characteristics to be considered by the designer in determining the application to individual problems as they occur.

Any suitable means may be applied to swing and retain the blocks of Figures 1-12 or to slide or otherwise shift and retain the adjusting link pivot point with other forms of movement.

The structural form

The characteristics which prove so valuable in the single cylinder engine as discussed above combine to great advantage in the multiple engines, whatever the number of cylinders. I have illustrated a four cylinder engine with the cylinders on quadrants, not only to comply with the statute, but in order to point out advantages of the combination in securing a long range of overlap in the explosion impulses applied by the pistons of adjoining cylinders, due to the fact that each explosion stroke continues throughout more than a quadrant of crank movement.

Figure 14:
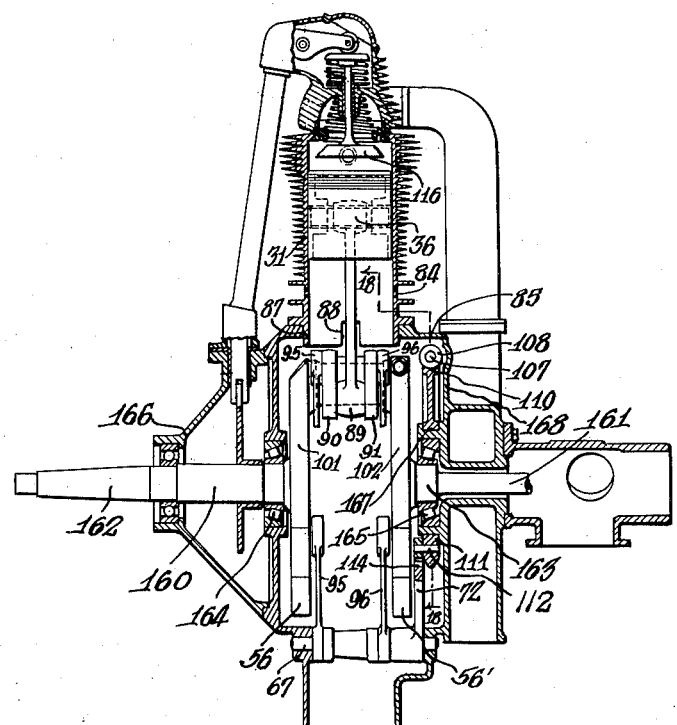
Figure 14 is a section of Figure 13 taken on the line 14—14.

In the structural illustration positions of the operating parts are best seen in Figures 13 and 14, the position of the controlling mechanism for the link pivot adjustment is best seen in Figure 15.

The crank case is shown at 85 as apertured at 86 to receive the ends 87 of cylinders 31—34, whose pistons, connecting rods, links, etc. have already been described.

For the purpose of accommodating the respective connecting rods in their angular positions the cylinders are slotted at 88, as best seen in Figure 13.

The rod and link connections

In balancing the thrust of the piston rod and the strains due to its pivotal engagement through pin 46 with the connecting rod, each piston rod terminal 89 is located centrally on the pin (Figure 14) and each connecting rod terminal is bifurcated, forming two bearings 90 and 91 which surround pin 46 and are spaced on opposite sides of the terminal 92. Likewise the link engagements with pin 63 are formed by link terminals 95 and 96 which span the terminals 90 and 91 and balance the stresses and strains upon each pin 63.

At the opposite end of each connecting rod, where all of the rods are coupled to the crank pin 53 it is again quite desirable to balance the stresses and strains and this is done by giving one of the connecting rods, such as 50 (Figures 16 and 17) central engagement at 97 with the crank pin 53 and bifurcating the ends of the rest of the connecting rods so that the terminals 98 of connecting rod 51 shall span the terminal 97, the terminals 99 shall span the terminals 98 and the terminals 100 shall span all of the other terminals.

The crank pin for convenience is fixed in one crank cheek 101 and is removably secured in cheek 102 by reducing the diameter of the crank pin at 103 so as to fit within an opening 104 where it can be clamped by a bolt through the split ends 105.

The cylinders are suitably cooled by fins.

Pivot block control

The pivot blocks for the links are shown in Figure 18 as controlled by hand through hand wheel 106, rod 107 and worm 108, supported at 109. This worm operates a worm segment 110 which forms part of the wrist plate 111 which is mounted to turn on a bearing surrounding the crank shaft. The wrist plate carries four pins 112 (Figures 14 and 15) each of which supports a plug 113 sliding within a slot 114 in the forked end 115 of block-operating lever 74 so that movement of the wrist plate in one direction will swing the four blocks in the same direction— say, clockwise—and to the same extent, whereas movement of the wrist plate in the opposite direction will swing the blocks in a counterclockwise direction.

Whichever position the propeller occupy on the crank shaft, whether it be at the right or left of the cylinder in Figure 14, it will be noted that the exhaust openings 84 on the side of the cylinder toward the propeller are directly in line with the slip stream from the propeller, which therefore blows cool air through ports 84 at intervals during economical operation, or whenever in the design of the engine the piston passes in either direction from across these ports so that this cold air passes across the piston at front or rear thereof to the opposite side of the cylinder interior and out through other openings 84 on the opposite side of the cylinder.

During such time as the exhaust ports are passed by the piston (i. e., preferably when the engine is running at its most economical setting) the slip stream may thus be used to drive air across the inner end of the piston, at the same time that exhaust takes place at those ports 84 which are on the opposite side of the cylinder. Where advantage is taken of this, it is the intention to make the exhaust ports more ample than would be necessary for exhaust alone in order that they may serve the purpose of exhaust at the far side from the propeller and at the same time permit air to be driven across from the near side (toward the propeller) to the far side.

It will be recognized also that this same condition of fact will allow the slip stream to sweep across the interior of the cylinder back of the piston during that portion of the piston travel in which the entire piston lies between the exhaust ports and the inner end of the cylinder. The piston is in such a position in Figure 17. This will tend to cool the piston by travel of cool air across the back face of the piston through this portion of each piston stroke.

The cheeks 101, 102 of the crank are mounted in any suitable manner upon the shaft 160, 161 (Figure 14) of which the end 162 is arranged to carry the propeller where used for airplane work or to receive the torque in whatever line of work to which the invention is applied.

The shaft 160 and hub 163 are mounted from the casing through roller bearings 164, 165. At the left of Figure 14 the outer member of the bearing is shown as supported within a web 166 and at the right the outer member of bearing 165 is supported in a sleeve 167 supported by web 168 which sleeve on its outer surface affords support for the wrist plate 111 by which the link supports are adjusted.

The casing and the holders for the auxiliary apparatus are appropriately divided so as to make assemblage quick and convenient.

In Figure 18 cylinders $31'$, $32'$, $33'$ and $34'$ are shown with their connecting rods $48'$, $49'$, $50'$ and $51'$ engaging different cranks $53'$—$53^4$ upon a crank shaft $162'$ and with their controlling links $58'$, $59'$, $60'$ and $61'$ pivoted upon an off-center shaft 187 whose position is controlled by arms 188 and any suitable shifting means for said arms. The pistons $36'$, $37'$, $38'$ and $39'$ and piston rods $41'$, $42'$, $43'$ and $44'$ are shown in the diagrammatic view for the purpose merely of completeness. It will be obvious that in this case as in the other structural illustrations the number of cylinders can be any number within reason as in the case of existing multi-cylinder internal combustion engines.

Figure 19:
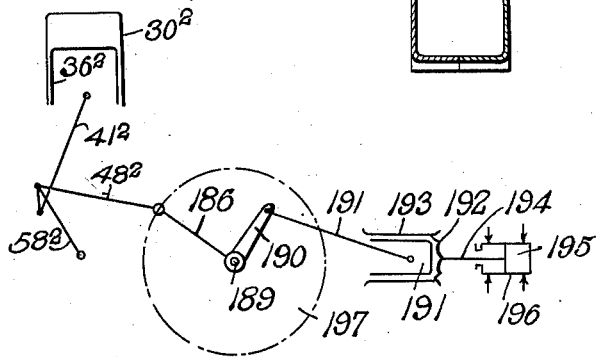
Figure 19 is a perspective view showing a single cylinder engine applied to a pump.

In Figure 19 I have shown diagrammatically a single cylinder $30^2$ whose piston $36^2$, piston rod $41^2$, link $58^2$ and connecting rod $48^2$ applied to a single crank 186, upon a shaft 189 from which a distributing crank 190 transmits energy through a pump connecting rod 191. The pump connecting rod operates upon a head 192 guided at 193 so as to operate a plunger rod 194 connected with a piston 195 within pump cylinder 196. The pump operates in any usual manner and the parts are carried over centers by fly wheel 197.

In operation the crank turns in the direction shown in Figures 13 and 15 and the cylinders fire in the order 30, 31, 32 and 33, each cylinder in turn firing before the end of the explosion stroke of the cylinder which fired previously.

Since the piston does not move outwardly to the same distance for the suction stroke as for the explosion stroke and does not move inwardly to the same distance for the compression stroke as for the scouring or scavenging stroke and the times of these several strokes are also different representing different angles of crank movement about the circumference, the instantaneous positions of the parts in the several cylinders are not the same as best seen from Figures 13 and 15.

Not only are the final positions of the pistons for the inner and outer several strokes different but my invention contemplates changing all of them except as to the scavenging stroke which preferably is a maximum for complete scouring at all times. My invention therefore not only takes advantage generally of the greater overlap between the explosion impulses of adjoining cylinders than in normal internal combustion engines, whatever the angular spacing of the cylinders about the crank shaft, but takes its greatest advantage from the adjustment of these differentials. By this adjustment the intake volume may be increased and the explosion displacement may be reduced, and by use with increased intake volume the percentage of compression may be increased and the space of the compressed gases may actually be reduced.

The overlap of the link upon the piston rod and upon that portion of the connecting rod between the two pivots at the outer end of the connecting rod makes it possible for me to obtain either a much more compact construction in which the pistons are placed closer together than would otherwise be possible or to secure the advantage of a longer link than could otherwise be had.

The fly wheel effect of the complete engine and the overlapping explosion impulses from the preceding stroke acts with each explosion to move the crank to the right in Figures 13 and 15 causing the connecting rod to move bodily to the right from the position shown in Figures 13 and 15 and as soon as the center of the pivot between the piston rod and connecting rod passes the line connecting the pivotal centers of the link the explosive impulses of any particular cylinder in question is applied to bring pressure upon its connecting rod to push it to the right and to continue this movement through more than a quadrant of crank movement until the piston rod reaches the end of its explosion stroke. Throughout the rest of the revolution of the crank the positions of the connecting rod, link, piston rod and piston are driven from and so controlled by the crank, resulting in the scavenging of the cylinder, the suction stroke and compressive stroke respectively all within the same turn of the crank as the explosion stroke. As previously indicated, though the explosion stroke takes more than a quadrant of crank movement (approximately 135° in one desirable embodiment of my invention) and the exhaust takes place also throughout more than a quadrant of crank movement the fact that exhaust is permitted through a portion of the explosion stroke somewhat reduces the angular movement of the crank corresponding to the sum of these two strokes.

As shown by the cam the suction stroke may be made very short and the compression stroke may be much less than a quadrant so that in the embodiment mentioned the suction and the compressive strokes need not take very much more than a quadrant of crank movement. Of course the determination of the suction and compression strokes, being capable of adjustment is not only affected by the proportions of the lengths of the members used and their relation but can be varied according to the preference of the designer. Likewise the angular extent (as represented by crank movement) of the explosion and scavenging strokes is subject to change according to the proportions given to the link and connecting rod lengths and the distance between the pivots of the connecting rod with the piston rod and link, the purpose being to accommodate to special needs of individual results where desired.

It will be evident that the broader aspects of my invention are independent of the particular law under which the link pivot is shifted, of the device by which the shifting takes place whether its movement be straight or arcuate and the shape and character of the curve where it is not straight and of the means by which the shift is effected or controlled.

I recognize that the character of the shift of link centers which is desirable will depend upon the type of engine to which the invention is applied, differing somewhat, for example, in a Diesel engine from the character of shift required in the engine illustrated.

I believe myself to be the first to control the path of an intermediate point in the connections between a piston and its crank and then to change the path of movement of the point for the purpose of varying a stroke or the strokes of the piston or the application of power therefrom.

I believe myself also to be the first in an engine of the general character shown to pivot the controlling link to the connecting rod at a point located between the pivotal point of the piston rod with the connecting rod and the piston when the piston is well in the cylinder; and the first to couple a plurality of pistons having explosive strokes of more than a quadrant to the same crank shaft; and the first to connect them with a common shaft.

I believe I am also the first to vary a differential between suction, compression and explosion strokes, or any one of them with respect to the others in an internal combustion engine.

It will be evident that the features of my invention as explained are capable of broad use without restriction to the structure shown and my intention is to ask construction of the same to cover all modifications and changes therefrom which fall within the reasonable spirit and scope of my invention.

Having thus described my invention, what I claim as new and desire to secure by Letters Patent is:—

1. The method of adjusting the performance of an internal combustion engine making four strokes of successively different lengths for each rotation of its crank, said strokes including a suction stroke, a compression stroke, an explosion stroke and a scavenging stroke, which consists in maintaining the point of extreme inward travel of the scavenging piston strokes, while varying the extent of outward piston movement upon the explosion strokes.

2. The method of adjusting the performance of an internal combustion engine making four strokes of successively different lengths for each rotation of its crank, said strokes including a suction stroke, a compression stroke, an explosion stroke and a scavenging stroke, which consists in maintaining the point of extreme inward travel of the scavenging piston strokes while varying the inward extent of the piston compression strokes.

3. The method of adjusting the performance of an internal combustion engine making four strokes of successively different lengths for each rotation of its crank, said strokes including a suction stroke, a compression stroke, an explosion stroke and a scavenging stroke, which consists in reversely varying the inward extent of the compression strokes and the outer extent of the explosion strokes.

4. The method of adjusting the performance of an internal combustion engine making four strokes of successively different lengths for each rotation of its crank, said strokes including a suction stroke, a compression stroke, an explosion stroke and a scavenging stroke, which consists in reversely varying the outward extent of the suction strokes and the outward extent of the explosion strokes.

5. The method of adjusting the performance of an internal combustion engine making four strokes of successively different lengths for each rotation of its crank, said strokes including a suction stroke, a compression stroke, an explosion stroke and a scavenging stroke, which consists in reversely varying the point of extreme outward piston travel on the suction strokes and the point of extreme inward piston travel on the compression strokes.

6. The method of adjusting the performance of an internal combustion engine making four strokes of successively different lengths for each rotation of its crank, said strokes including a suction stroke, a compression stroke, an explosion stroke and a scavenging stroke, which consists in varying simultaneously the point of extreme outward piston travel on the explosion strokes, the point of extreme outward piston travel on the suction strokes and the point of extreme inward piston travel on the compression strokes.

7. In an internal combustion engine of the type having the piston making four strokes of successively different lengths for each rotation of the crank and having the piston rod pivoted to a connecting rod which engages the crank pin and in which the movement of the connecting rod is controlled by a pivotally supported link also pivoted to the connecting rod, the method of control of operation of the strokes of the engine which consists in selecting the lengths and relations of the piston rod, connecting rod, crank and link so as to secure substantially uniform inward limit of travel for the scavenging strokes for all pivotal positions of the link and then altering the other strokes by shifting the pivot support point of the link reversely with respect to the axis of the cylinder.

8. In an internal combustion engine, a piston, a piston rod, a crank, a connecting rod, a link having a stationary pivot support at one end and pivot connection with the connecting rod at the other and means for adjusting the point of pivot support, the said connecting rod having triangularly spaced pivot connections respectively to the crank, to the link and to the piston rod.

9. In an internal combustion engine, a piston, a piston rod, a crank, a connecting rod connected to the crank at one end and to the piston rod at the other, a link pivoted to the connecting rod at a point different from the piston rod and adapted to swing about a center and means for shifting the center about which the link turns.

10. An internal combustion engine having in normal operation difference in length between the compression and clearing strokes and an intervening connecting rod between the piston rod and the crank, means for controlling the movement of the connecting rod and means for varying the control of the connecting rod to change the length of the compression strokes without effecting any substantial change in the point of extreme inward travel of the piston on the clearing strokes.

11. An internal combustion engine having in normal operation difference in length between the explosion and suction strokes and an intervening connecting rod between the piston rod and the crank, means for controlling the movement of the connecting rod and means for varying the control of the connecting rod to change the comparative lengths of the explosion and suction strokes without effecting any substantial change in the point of extreme inward travel of the piston on the scavenging strokes.

12. In an internal combustion engine having a piston, a piston rod, a crank, a connecting rod between the piston rod and the crank and a swinging link pivoted to the connecting rod and controlling the path of movement of the connecting rod and crank, the connecting rod making pivotal connections to the piston rod, to the swinging link and to the crank at points that are relatively triangularly spaced, the novelty which consists in varying the point about which the link swings to vary the length of the explosion strokes without effecting any substantial change in the point of extreme inward travel of the piston on the scavenging strokes.

13. In an internal combustion engine having a piston, a piston rod, a crank, a connecting rod between the piston rod and the crank and a pivotally supported link pivoted at its free end to the connecting rod and controlling the path of movement of the connecting rod and crank, the connecting rod making pivotal connections to the piston rod to the swinging link and to the crank at points that are relatively triangularly spaced, the novelty which consists in varying the length of the suction stroke without materially changing the point of extreme inward travel of the piston on the scavenging strokes and by shifting the point of pivotal support of the link.

14. In an internal combustion engine having a piston, a piston rod, a crank, a connecting rod between the piston rod and the crank and a pivotally supported link pivoted at its free end to the connecting rod and controlling the path of movement of the connecting rod and crank, the novelty which consists in shifting the pivot support of the link to shift the path of movement and thereby to concurrently and oppositely vary the lengths of the explosion and suction strokes without materially changing the point of extreme inward travel of the piston on scavenging strokes.

15. In an internal combustion engine having a piston, a piston rod, a crank, a connecting rod between the piston rod and the crank, a swinging link pivoted to the connecting rod, a pivot support about which the link swings, said link controlling the path of movement of the connecting rod and crank, the novelty which consists in concurrently and oppositely varying the lengths of the explosion and suction strokes, increasing the percentage of compression with increased suction stroke and reducing the percentage of compression with reduced suction stroke and by shifting the pivot support.

16. In an internal combustion engine, a cylinder, a piston therein, a piston rod for the piston, an L-shaped connecting rod pivoted at the short end of the L to the piston rod, a crank connected to the outer end of the longer arm of the L, a link pivotally connected to the L near the junction of the two arms and a support for the link adapted to be varied.

17. In an internal combustion engine, a cylinder having an axis, a piston for said cylinder, a piston rod pivoted at one end to said piston, an L-connecting rod pivoted in the short arm of the L to the piston rod, a link pivoted to the connecting rod near the junction of the arms of the L, a crank pivoted to the long arm of the L, a pivot for the support, a movable support for the link, and a guide along which the support is adapted to be moved, the parts being so proportioned that the piston completes a cycle of suction, compression, explosion and exhaust strokes for each rotation of the crank and the selected path of guiding being such that movement of the link support in one direction increases the suction stroke and reduces the explosion stroke and movement in the opposite direction reduces the explosion stroke and increases the suction stroke.

18. In an internal combustion engine, a cylinder having an axis, a piston for said cylinder, a piston rod pivoted at one end to said piston, a connecting rod pivoted to the other end of the piston rod, a link, a crank, a movable pivotal support for the link, and a guide for the support, the said connecting rod having three triangularly spaced pivot connections respectively with the clamp, with the piston rod and with the free end of the link, the parts being so proportioned that the piston completes a cycle of suction, compression, explosion and scavenging strokes for each rotation of the crank and that movement of the link support along its guide in one direction increases the suction stroke and reduces the explosion stroke, and movement in the opposite direction reduces the explosion stroke and increases the suction stroke.

19. In an internal combustion engine, a cylinder having an axis, a piston for said cylinder, a piston rod pivoted at one end to said piston, a connecting rod pivoted to the piston rod, a link pivoted to the connecting rod, a crank pivoted to the connecting rod, a movable pivotal support for the link, and a guide for the support, the connecting rod having its three pivot connections respectively on the piston rod, to the link and to the crank triangularly spaced, the parts being so proportioned that the piston completes a cycle of suction, compression, explosion and scavenging strokes for each rotation of the crank and that movement of the link support along its guide in one direction reduces the suction stroke and reduces the percentage of compression of the suction gases and movement in the opposite direction increases the suction stroke and increases the percentage of compression of the gases.

20. In an internal combustion engine, a cylinder having an axis, a piston for said cylinder, a piston rod pivoted at one end to said piston, a connecting rod pivoted to the piston rod, a link pivoted to the connecting rod near the pivot connection thereof with the piston rod, a crank pivoted to the connecting rod, a movable pivotal support for the link, and an adjustment guide for the support of the link, the parts being so proportioned that the piston completes a cycle of suction, compression, explosion and scavenging strokes for each rotation of the crank, that movement of the link support along the adjustment guide in one direction simultaneously increases the length of the explosion stroke and reduces the percentage of compression of the gases and in the opposite direction reduces the length of the explosion stroke and increases the percentage of compression of the gases.

21. In an internal combustion engine, a cylinder, a piston, a crank, a connecting rod engaging the crank at one end of the rod, a piston rod pivoted to the connecting rod at the other end of the connecting rod, a link pivoted to the connecting rod at a different point from the piston rod pivot and having a pivot support at its other end and means for giving the pivot support of the link arcuate adjustments.

22. In an internal combustion engine, a cylinder, a piston, a crank, a connecting rod engaging the crank at one end of the rod, a piston rod pivoted to the connecting rod at the other end of the connecting rod, a link pivoted to the connecting rod at the said other end at a point thereof transversely spaced from the pivot connection between the connecting rod and piston rod, a second link pivotally supporting the inner end of the first link and normally stationary but adapted to angular adjustment to provide the said pivot support with a range of adjustments generally transverse to the axis of the cylinder and curved convexly on the cylinder side of the curve.

23. In an internal combustion engine, a cylinder, a piston therein, a crank, a connecting rod engaging the crank at one end of the rod, a piston rod pivoted to the connecting rod at the other end of the connecting rod, a link swinging about a pivotal support, and pivoted to the connecting rod at a point eccentric to the piston rod pivot therewith, and means for moving the pivotal support through a range of adjustments all providing substantially the same point of extreme inward travel of the piston for the scavenging piston strokes.

24. In an internal combustion engine, a cylinder, a piston therein, a piston rod, a crank arm, a crank pin connected therewith, a connecting rod pivotally connected to the piston rod and engaging and driving the crank pin and a link guiding the movement of one end of the connecting rod and pivotally connected to it to overlap part of the length of the piston rod at the completion of the compression stroke of the piston.

25. An explosion engine, a cylinder, a piston therein, a piston rod, a crank arm, a crank pin connected therewith, a connecting rod pivotally connected to the piston rod engaging and driving the crank pin, a pivoted link guiding the movement of one end of the connecting rod and pivotally connected to it to overlap part of the length of the piston rod at the completion of the compression stroke of the piston and means for shifting the point at which the link is supported to adjustably vary the stroke of the piston.

26. In an internal combustion engine, a cylinder, a piston therein, an engine shaft, a crank pin and crank thereon, a connecting rod pivoted to the crank pin at one end, a piston rod pivoted to the piston at one end and at its other end pivoted to the connecting rod at another end, a link control for the connecting rod pivoted to the connecting rod at another point than the connection between the connecting rod and piston rod and farther from the pivot connection between the connecting rod and crank pin than from the pivot connection between the connecting rod and piston rod and means for varying the path of the pivot between the link and connecting rod.

27. In an internal combustion engine, a cylinder, a piston therein having exhaust ports at the extreme end of the piston stroke, a piston rod connected with the piston, a crank, a crank pin, a connecting rod engaging the crank pin and pivoted to the piston rod, means for controlling movement of the connecting rod and means for shifting the path of movement of the connecting rod whereby the piston passes the exhaust ports on its explosion stroke with one setting of the movement of the link and not at another setting.

28. In an internal combustion engine, a cylinder, a piston therein, an engine shaft, a crank pin and crank thereon, a connecting rod pivoted to the crank pin at one end, a piston rod pivoted to the piston at one end and to the connecting rod at another end, a link control for the connecting rod pivoted to the connecting rod at another point than the connection to the piston rod and farther from the crank pin end of the link than the connection between the connecting rod and piston rod.

29. In an internal combustion engine, a cylinder, a piston, a piston rod, a crank shaft, a crank thereon, a link, a support and a connecting rod, the connecting rod having triangularly spaced pivot connections respectively with the crank, piston rod and link, the piston rod hinging at opposite ends to the piston and to the connecting rod at one of the said pivot connections, the link pivoting at one end to the connecting rod at another of the said pivot connections and at the other end to the support, the crank shaft and support pivot being axially offset from and on opposite sides of a plane containing the cylinder axis and at right angles to the plane of rotation of the crank, and the parts dimensioned so that the piston makes two reciprocations (four strokes) for each rotation of the crank.

30. The mechanism of claim 29 characterized by the link and piston rod at substantially the end of the compression strokes alining with a common plane perpendicular to the rotation of the crank and at an angle with the cylinder axis.

31. The mechanism of claim 29 characterized by means for adjusting the pivotal support in a direction toward and away from the said axial plane of the cylinder.

WARREN P. VALENTINE.